United States Patent
Jung

(10) Patent No.: US 7,869,839 B2
(45) Date of Patent: Jan. 11, 2011

(54) MOBILE PHONE

(75) Inventor: Kyung Sung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 761 days.

(21) Appl. No.: 11/777,086

(22) Filed: Jul. 12, 2007

(65) Prior Publication Data

US 2008/0015000 A1    Jan. 17, 2008

(30) Foreign Application Priority Data

Jul. 14, 2006    (KR) ............ 10-2006-0066452

(51) Int. Cl.
*H04M 1/00* (2006.01)

(52) U.S. Cl. ............ 455/575.1; 455/90.3; 455/550.1; 455/575.8; 455/347

(58) Field of Classification Search ............ 455/575.3, 455/550.1, 90.3, 575.1, 575.5, 575.8, 95, 455/346, 347, 349; 200/513, 341–345, 302.1, 200/302.2, 314, 517

See application file for complete search history.

(56) References Cited

U.S. PATENT DOCUMENTS

| 6,166,342 | A | * | 12/2000 | Chou | 200/344 |
| 6,467,683 | B2 | * | 10/2002 | Jun | 235/145 R |
| 6,483,719 | B1 | * | 11/2002 | Bachman | 361/816 |
| 7,351,928 | B2 | * | 4/2008 | Harada | 200/302.1 |
| 2003/0211873 | A1 | * | 11/2003 | Komiyama | 455/575.3 |
| 2006/0075509 | A1 | * | 4/2006 | Kishon | 726/34 |

* cited by examiner

*Primary Examiner*—Sujatha Sharma
(74) *Attorney, Agent, or Firm*—Birch, Stewart, Kolasch & Birch, LLP

(57) ABSTRACT

A mobile phone is provided. The mobile phone includes a first case, a frame defining a space for elements of the mobile phone, the frame together with the first case dividing the space into a plurality of chambers, and a seal interposed between the frame and the first case for independently sealing more than one of the plurality of chambers.

19 Claims, 7 Drawing Sheets

MOBILE PHONE

CROSS REFERENCE TO RELATED APPLICATIONS

This application claims the benefit of Korean Patent Application No. 10-2006-0066452, filed on Jul. 14, 2006, which is hereby incorporated by reference as if filly set forth herein.

BACKGROUND OF THE INVENTION

1. Field of the Invention

1. The present invention relates to a mobile communication device, and more particularly, to a mobile phone having a waterproof structure capable of preventing water from entering the device through boundary portions of an assembled case of the device.

2. Description of Related Art

Generally, mobile communication devices, such as mobile phones and PDAs, have been developed to a level capable of providing services associated with text information, image information, and games, in addition to the delivery of simple voice information.

Recently, multi-function mobile communication devices have also been developed which have an audio player function for playing back audio files, such as MP3 files, a digital camera function for capturing digital photographic images and video images, and a radio and video broadcast receiver function. Thus, recently developed mobile communication devices have more diverse and complex functions.

In addition to having multiple functions, the portability of a mobile communication device has also been taken into consideration. As a result, such a mobile communication device shows a tendency toward an increased number of functions, more sophisticated functions, and miniaturization.

Meanwhile, the case of such a mobile communication device generally includes two pieces assembled together. In the assembled case, various elements of the mobile communication device are contained. However, such a mobile communication device has no appropriate waterproof function. That is, when the user carelessly lets the mobile communication device fall into water, spills a drink onto the mobile communication device, or uses the mobile communication device in the midst of rain, water may penetrate into the case of the mobile communication device through the boundary of the case pieces, thereby damaging the elements contained in the case.

BRIEF SUMMARY OF THE INVENTION

Accordingly, the present invention is directed to a mobile communication device that substantially obviates one or more problems due to limitations and disadvantages of the related art.

An object of the present invention is to provide a mobile communication device having a waterproof structure capable of preventing water from entering the device through boundary portions of an assembled case of the device.

Another object of the present invention is to provide a waterproof structure for a mobile communication device that can provide a sufficient waterproof function using a reduced number of fastening portions and a reduced fastening force.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile phone is provided. The mobile phone includes a first case, a frame defining a space for elements of the mobile phone, the frame together with the first case dividing the space into a plurality of chambers, and sealing means interposed between the frame and the first case for independently sealing more than one of the plurality of chambers.

In another aspect, the sealing means is waterproof.

In yet another aspect, the plurality of chambers includes a first chamber having a first perimeter, and the sealing means may include a keypad located in the first chamber, the keypad may have an edge arranged to surround the first perimeter, and the edge may be interposed between the first case and the frame.

In still another aspect, the mobile phone may include a keypad located in one of the plurality of chambers, wherein the one of the plurality of chambers has a first perimeter, and the sealing means may include a key skin disposed on the keypad, the key skin may have an edge arranged to surround the first perimeter, and the edge may be interposed between the first case and the frame.

In a different aspect, the sealing means may include a waterproof ring arranged to surround a perimeter of one of the chambers, the waterproof ring being interposed between the first case and the frame. In addition, the waterproof ring may be integral with one of the first case and the frame.

In still another aspect, the frame may include a partition member configured to divide the space into two chambers of the plurality of chambers, and the partition member may include a groove in which the sealing means is located.

In another aspect, the frame may include a sidewall located inside the first case such that the sidewall surrounds the plurality of chambers, and a flange extending outwardly from the sidewall, where the flange may be coupled to the first case by fastening members.

In yet another aspect, the mobile phone may include a second case located at a surface of the frame opposite the first case, the second case may be coupled to the first case to cause the frame and the first case to be in contact with each other.

In another aspect, the mobile phone may include an opening formed in a sidewall of the frame to allow a battery to be inserted into one of the plurality of chambers, a battery cover to close the opening, and a waterproof member interposed between the battery cover and the frame when the battery cover closes the opening.

According to principles of the preset invention a mobile phone having a first case, a frame defining a space for elements of the mobile phone, the frame together with the first case dividing the space into a first chamber and a second chamber, a first sealing member being interposed between the frame and the first case for sealing the first chamber, and a second sealing member being interposed between the frame and the first case for sealing the second chamber, where the first sealing member and the second sealing member are adapted to independently seal the first chamber and the second chamber, is also provided.

In a further aspect, the first chamber may have a first perimeter, and the first sealing member may be a keypad located in the first chamber. The keypad may have an edge arranged to surround the first perimeter, and the edge may be interposed between the first case and the frame.

In a different aspect, the mobile phone may include a keypad located in the first chamber, and wherein the first chamber may have a first perimeter, and the first sealing member may be a key skin disposed on the keypad. The key skin may have an edge arranged to surround the first perimeter, and the edge may be interposed between the first case and the frame.

In yet another aspect, the mobile phone may include an opening formed through the frame, the opening communicating with the first chamber, a battery inserted into the first chamber through the opening, a battery cover for closing the opening, and a waterproof member interposed between the battery cover and the frame when the battery cover closes the opening.

In another aspect, the frame may include a sidewall arranged inside the first case such that the sidewall surrounds the first and second chambers, and a flange extending outwardly from the sidewall, the flange being coupled to the first case by fastening members.

In still another aspect, the mobile phone may include a second case arranged to surround the frame, the second case being coupled with the first case to cause the frame and the first case to be in contact with each other.

In a different aspect, the mobile phone may include a display located in the second chamber.

According to principles of the present invention, a mobile phone having a first case, a frame, in cooperation with the first frame, defining a plurality of chambers, and sealing means interposed between the frame and the first case for independently sealing more than one of the plurality of chambers.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
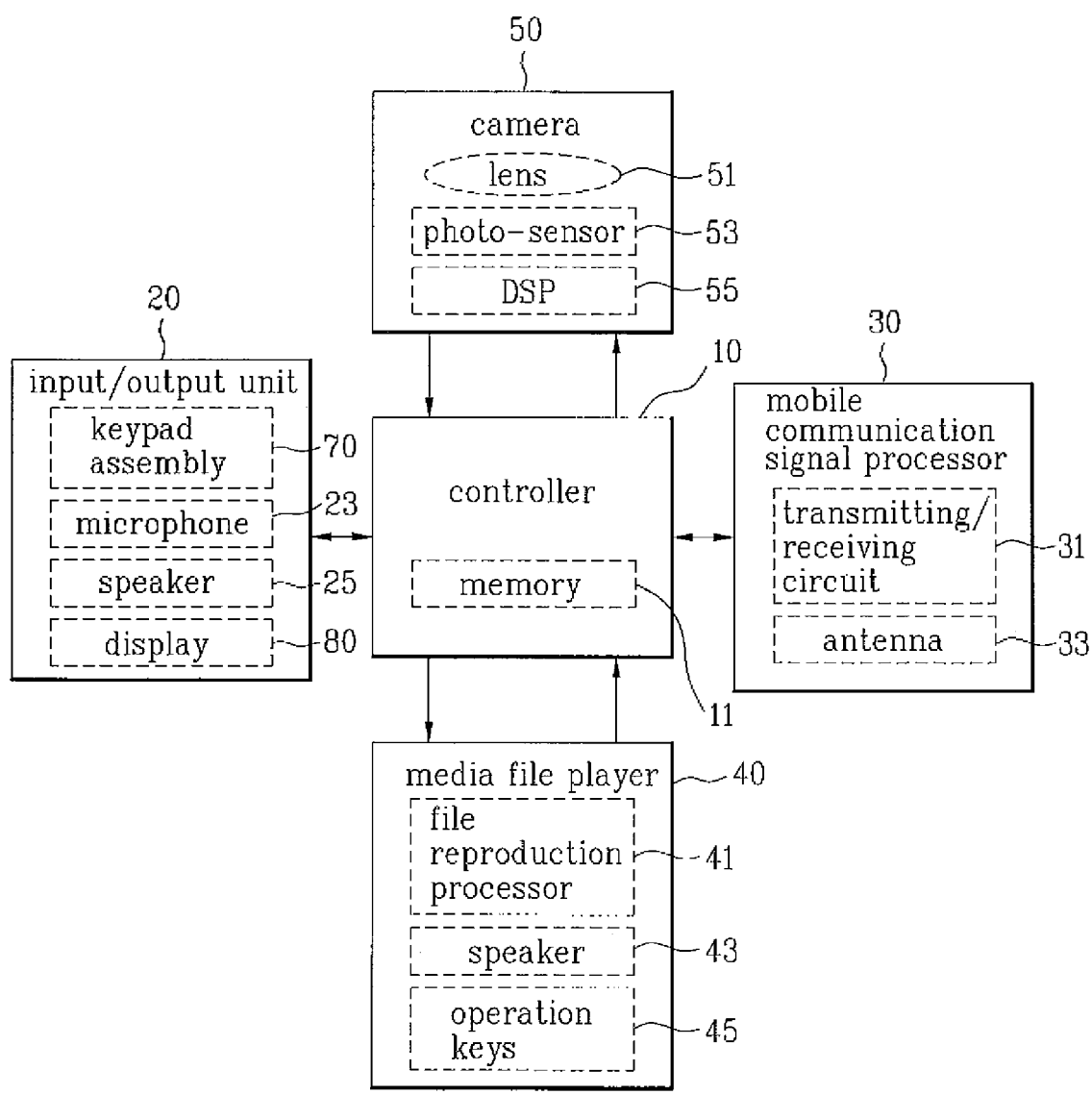
FIG. 1 is a block diagram schematically illustrating a configuration of a mobile communication device according to an exemplary embodiment of the present invention.

Reference will now be made in detail to the preferred embodiments of the present invention, examples of which are illustrated in the accompanying drawings. In the following description, the same terms and reference numerals will be used for the same parts, and no repeated description thereof will be given.

Figure 2:
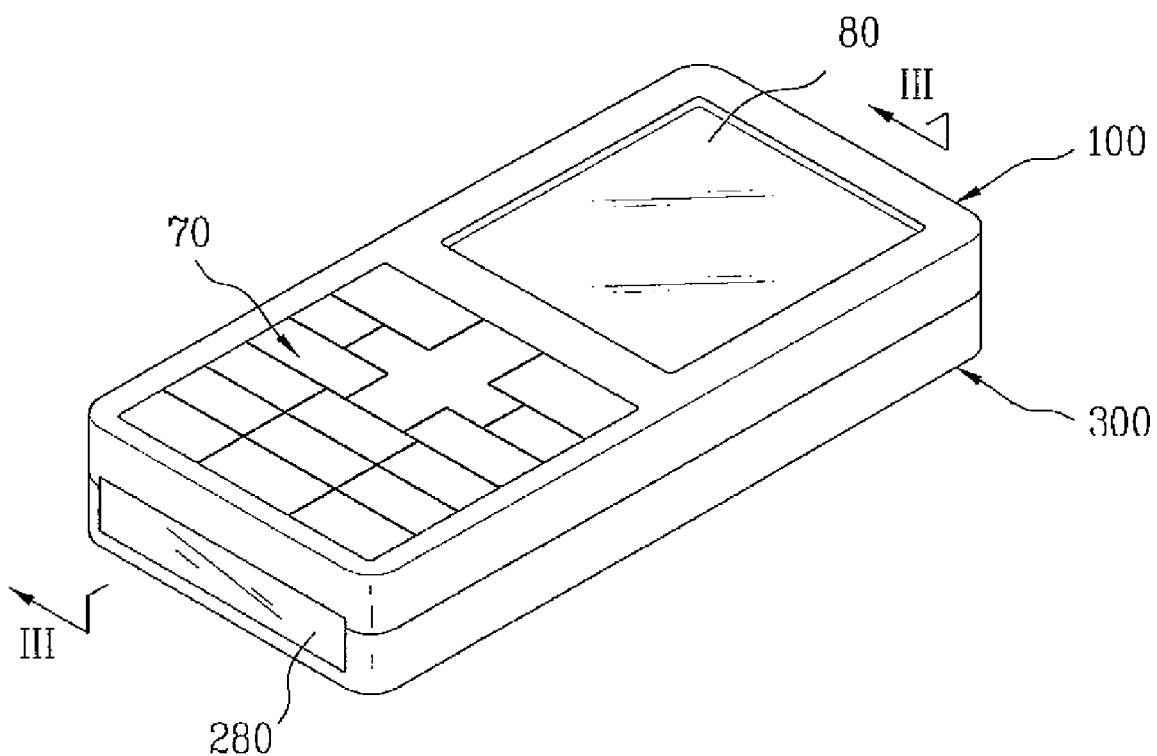
FIG. 2 is a perspective view of the mobile communication device according to the exemplary embodiment of the present invention.
Figure 3:
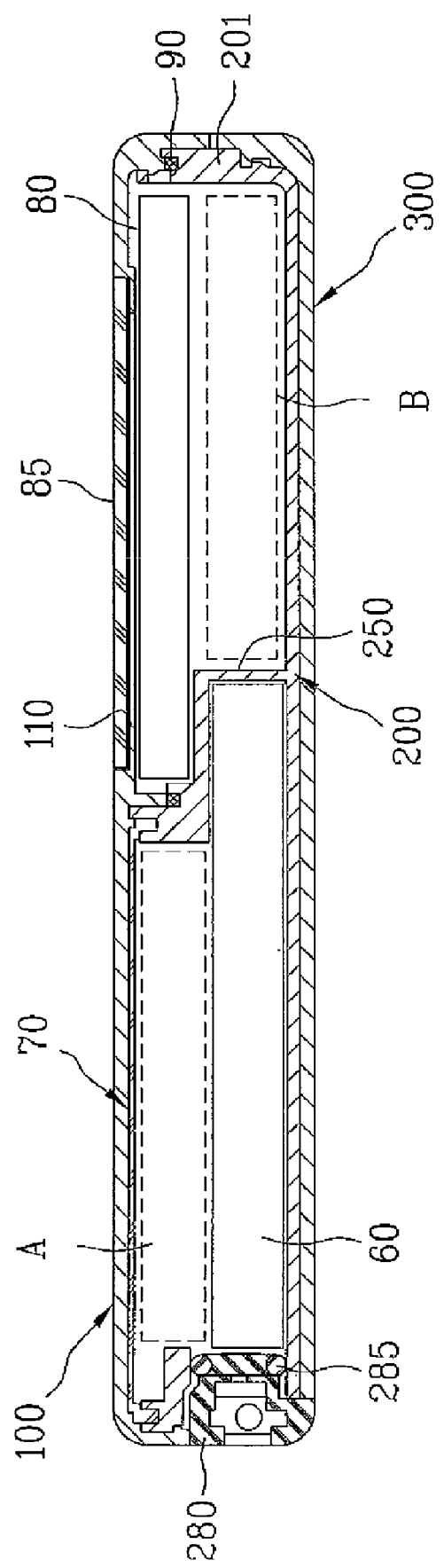
FIG. 3 is a cross-sectional view taken along the line III-III of FIG. 2.

FIG. 1 is a block diagram schematically illustrating a configuration of an exemplary embodiment of the mobile communication device according to the present invention. As shown in FIG. 1, the mobile communication device according to the present invention includes a controller 10, an input/output unit 20, a mobile communication signal processor 30, and a media file player 40. These elements are mounted in a bar type case which includes, for example, a first case 100, a frame 200, and a second case 300 assembled together, as shown in FIGS. 2 and 3.

The controller 10 includes constituent elements such as a microprocessor and a memory 1. Although not shown, the constituent elements of the controller 10 may be mounted on a circuit board arranged in the case.

The input/output unit 20 includes a keypad assembly 70 for enabling the user to input a desired signal by pressing a desired key of the keypad assembly 70, a microphone 23 for inputting an external sound, a speaker 25 for converting a signal into a sound wave, and a display 80, such as an LCD.

The mobile communication signal processor 30 includes a transmitting/receiving circuit 31. The transmitting/receiving circuit 31 includes a transmission signal processor (not shown) and a reception signal processor (not shown). The transmission signal processor is configured to process a signal or information input through the input/output unit 20, or process information stored in the memory 11 of the controller 10, and to transmit the processed signal or information. The reception signal processor is configured to receive an external electric wave, and to process the received electric wave. The mobile communication signal processor 30 also includes an antenna 33 for externally outputting the electric wave signal processed by the transmitting/receiving circuit 31, or receiving an external electric wave signal. The mobile communication device can wirelessly communicate with an external device, for example, a base station, via the mobile communication signal processor 30.

The media file player 40 reproduces an audio file, such as an MP3 file, or a media file, such as a video file, stored in the memory 11 of the controller 10, and externally outputs the reproduced signal. To this end, the media file player 40 includes a media file reproduction processor 41 for processing the audio file or the media file, a speaker 43 for outputting the signal processed by the file reproduction processor 41 in the form of a sound, and operation keys 45 for enabling the user to easily operate the media player 40.

While a separate speaker 43 has been identified for the media file player 40, it is understood that the speaker 25 of the input/output unit 20 may be used. However, the speaker 43 may be provided separately from the speaker 25, in order to provide a sound with better audio qualities than that provided by the speaker 25.

Similarly, the keypad assembly 70 may be used in place of the operation keys 45. However, the operation keys 45 may be separately provided, for an enhanced convenience of the user.

As shown in FIG. 1, the mobile communication device according to the present invention may further include a camera 50. The camera 50 includes a lens 51, a photo-sensor 53 for converting light emerging from the lens 51 into an analog signal, and a digital signal processor (DSP) 55 for converting the analog signal output from the photo-sensor 53 into a digital signal.

The camera 50 may also include a mirror (not shown) for assisting the user in photographing his figure. The camera may further include a flash (not shown) for assisting in performing an image capture in a dark area. Although not shown in FIG. 2, the camera 50 may be installed such that the lens 51 is exposed at the back surface of the case.

Since the structures of the above-described controller 10, input/output unit 20, mobile communication signal processor 30, media file player 40, and camera 50 are similar to those of conventional mobile communication devices, no further detailed description thereof will be given.

In the conventional art, these components were typically protected by a single ring-shaped waterproof member interposed between the boundary portions of a first case and a second cases, in order to prevent water from penetrating into the interior of the case via the boundary portions of the first and second cases, thereby damaging the above-described elements.

With such an arrangement, it is necessary to press the boundary portions of the first and second cases against each other through the entire region thereof, using a large force. Accordingly, it is necessary to strongly fasten the first and second cases by forming fastening bosses at many positions along the periphery of each of the first and second cases, respectively, and fastening fastening members through the aligned fastening bosses of the first and second cases, respectively, using a large fastening force. However, when the fastening force of the fastening members is weakened, or when the boundary portions of the first and second cases are non-uniformly fastened throughout the entire region thereof by the fastening members, water may penetrate into the interior of the case.

Figure 4:
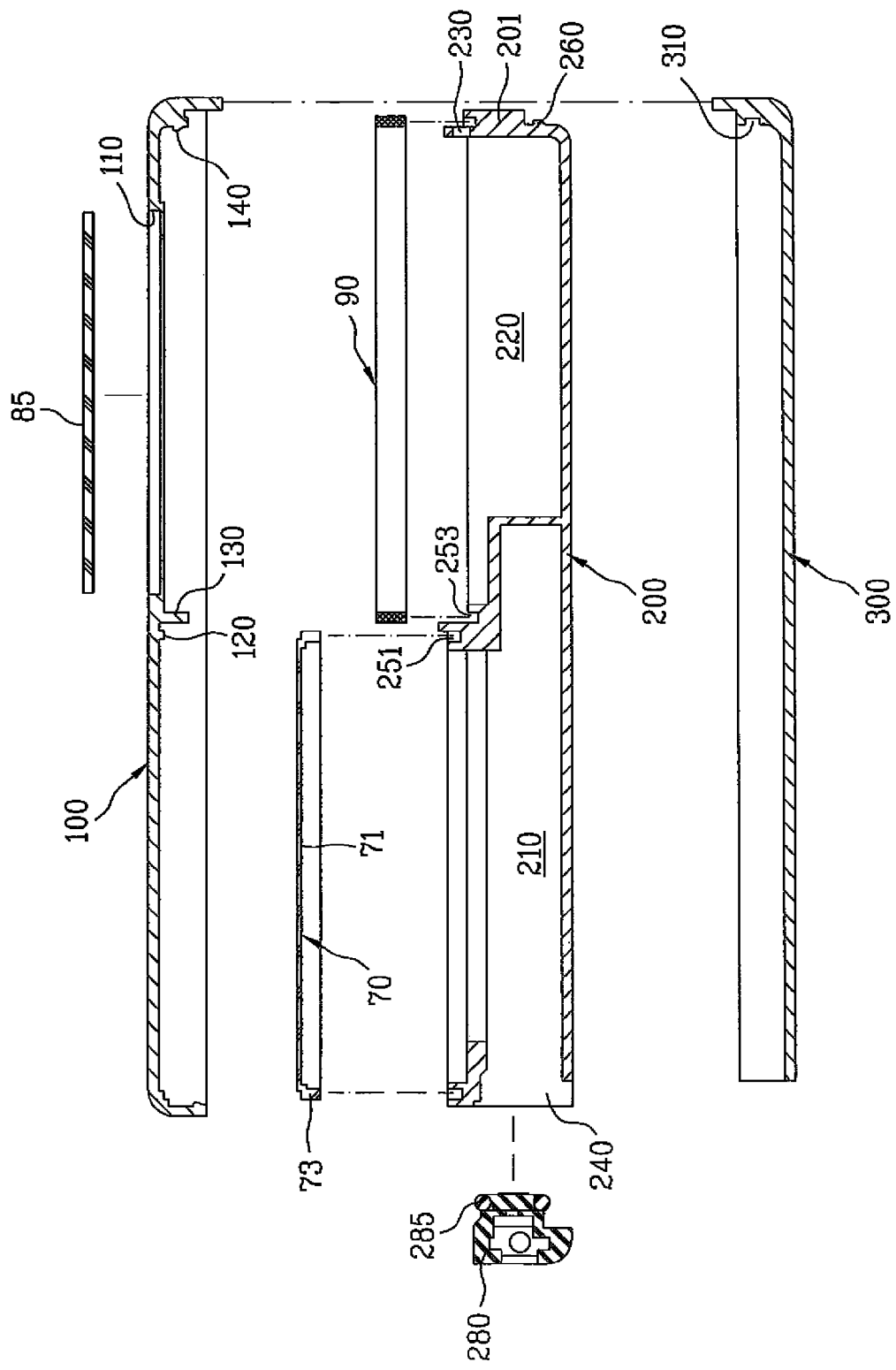
FIG. 4 is an exploded sectional view of FIG. 3.
Figure 5:
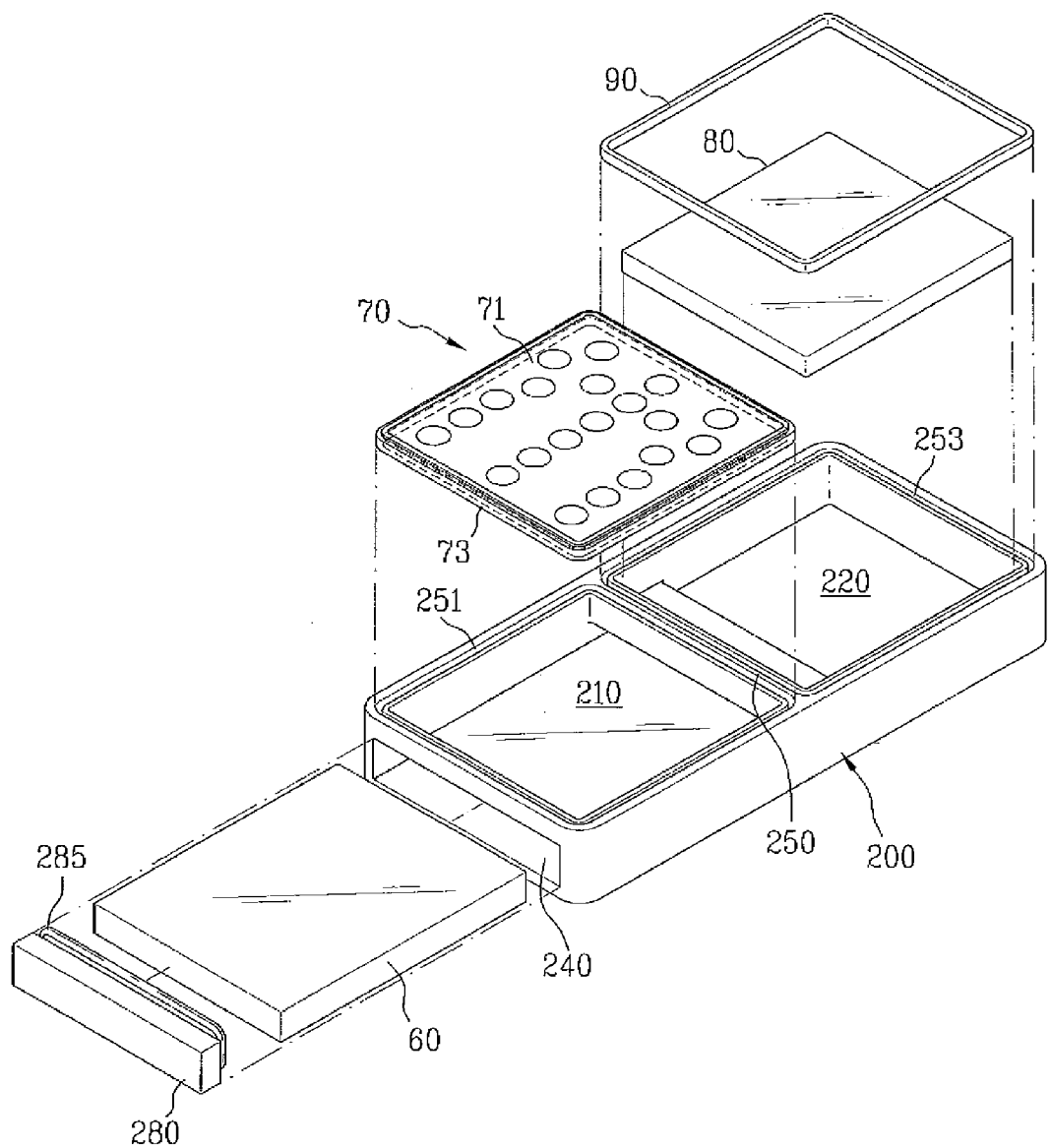
FIG. 5 is an exploded perspective view schematically illustrating connection of the frame with elements to be mounted on or in the frame.

In order to avoid such a problem, the present invention provides a mobile communication device, in this exemplary embodiment, a mobile phone with a unique waterproof or sealing structure, as shown in FIGS. 3 to 5. That is, the mobile phone according to the present invention includes a frame 200, which partitions the interior of the case into a plurality of chambers, for example, two chambers, and waterproof members for independently water-proofing respective chambers. Hereinafter, the waterproof structure according to the present invention will be described in more detail with reference to FIGS. 3 to 5.

First, the case of the mobile communication device according to an exemplary embodiment of the present invention may have a configuration including a first case 100, a second case 300, and the frame 200, as described above, or the case of the mobile communication device according to another exemplary embodiment of the present invention may have a configuration including the first case 100 and frame 200, but excluding the second case 300. In the former configuration, the appearance of the mobile communication device is defined by the first case 100 and second case 300. In the latter configuration, the frame 200 serves the same function as the second case 300 by defining the appearance of the mobile communication device, together with the first case 100.

Figure 9:
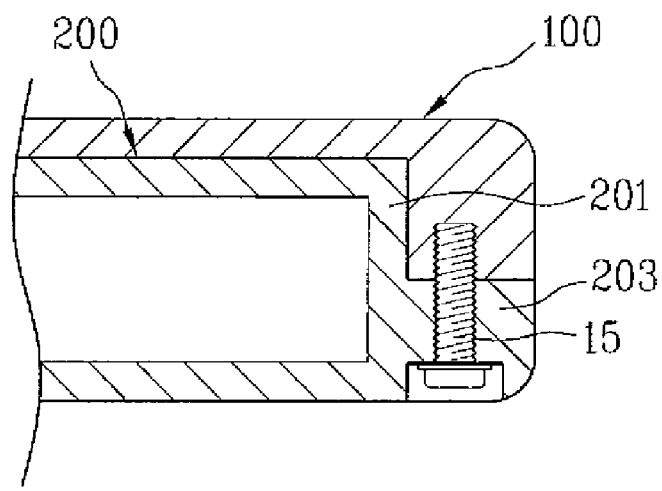
FIG. 9 is a sectional view of another exemplary embodiment of the present invention illustrating a coupled state of the first case and frame.

In particular, FIGS. 2 to 7 illustrate an embodiment in which the case includes the first case 100, second case 300, and frame 200. FIG. 9 illustrates an embodiment in which the case includes the first case 100 and frame 200.

As shown in FIGS. 2 and 3, the first case 100 forms an upper portion of the case of a mobile phone having a bar type structure. An opening 110 for the display 80 is formed through the first case 100. A transparent window member 85 may be fitted in the opening 110. Specifically, the first case 100 is formed with a rim arranged to su r round the opening 110. The edge of the window member 85 is seated on the rim. The edge of the window 85 is firmly fixed to the rim of the first case 100 by an adhesive (not shown) having an excellent waterproof effect. Accordingly, it is possible to effectively prevent water from penetrating into the first case 100 via the boundary between the window member 85 and the opening 110.

As shown in FIG. 3, the frame 200 is arranged beneath the first case 100 such that it defines a space for receiving elements of the mobile communication device, together with the first case 100. Specifically, the frame 200 is arranged such that the bottom thereof faces a lower surface, namely, an inner surface, of the first case I 00. The frame 200 has a sidewall 201 extending from the bottom of the frame 200 towards the first case 100. The sidewall 201 is arranged to be inside the sidewall of the first case 100. Thus, the bottom and sidewall 201 of the f lame 100 and the lower surface of the first case 100 define a certain space. In this space, the above-described elements of the device are mounted.

A partition member 250 is provided at the frame 200, to partition the space defined by the frame 200 into a plurality of chambers. The partition member 250 extends from the bottom of the frame 200, and from the sidewall 201, to divide the space into a plurality of independent chambers. For reference, FIGS. 3 to 5 illustrate a structure in which the partition member 250 partitions the space into two chambers, namely, a first chamber 210 and a second chamber 220. It is understood that additional chambers can be provided.

The first chamber 210 receives, for example, the keypad assembly 70 and a battery 60. The second chamber 220 receives, for example, the display 80. Although the keypad assembly 70 and battery 60 are received in the first chamber 210, and the display 80 is received in the second chamber 220, there are redundant spaces A and B in the first and second chambers 210 and 220, respectively. Other elements to be mounted in the device can be arranged in the redundant spaces A and B. Meanwhile, although not shown, the partition member 250 may be formed with passages for circuits or cables for electrically connecting the elements respectively arranged in the first and second chambers 210 and 220.

In the mobile communication device according to the present invention, respective chambers, namely, the first and second chambers 210 and 220, are independently sealed, such as being waterproofed by respective waterproof members. For example, the first chamber 210 is Waterproofed by the keypad assembly 70, which also functions as a waterproof member. A waterproof ring 90 waterproofs the second chamber 220. This will be described in more detail hereinafter.

As noted above, the waterproof member of the first chamber may include, for example, the keypad assembly 70. That is, the keypad assembly 70 includes a keypad 71, as shown in FIGS. 3 to 5. The keypad 71 has an edge 73 that functions as a waterproof member.

The keypad 71 may include, for example, a flexible circuit board formed with a plurality of dome switches. The keypad 71 is arranged in the first chamber 210 and the dome switches may be exposed through an opening of the first case 100, to enable the user to press the dome switches. It is understood that separate buttons may be mounted to the opening such that, when the user presses a desired one of the buttons, the pressed button presses a corresponding one of the dome switches.

The edge 73 of the keypad 71 formed with a plurality of dome switches surrounds the perimeter of the first chamber 210 when the keypad 71 is arranged in the first chamber 210. When the first case 100 and frame 200 are in close contact with each other, the edge 73 is interposed between the first case 100 and the frame 200.

In this arrangement, the keypad 71 constituted by a flexible circuit board and the edge 73 of the keypad 71 are made of a synthetic resin material having a waterproof property. As a result, the first chamber 210 is completely sealed by the keypad 71 and the edge 73 of the keypad 71. Accordingly, penetration of water into the first chamber 210 is effectively prevented.

For an enhancement in waterproof performance ) the edge 73 of the keypad 71 may extend downwardly by a desired length such that it is fitted in a groove 251 formed at the partition member 250 and sidewall 201 of the frame 200, as shown in FIGS. 4 and 5. In addition, a protrusion 120 may extend from the lower surface of the first case 100 such that when the first case 100 and frame 200 are in close contact with each other, the protrusion 120 presses the edge 73 of the keypad 71 fitted in the groove 251, as shown in FIG. 4. In this case, the waterproof performance can be further enhanced.

Figure 6:
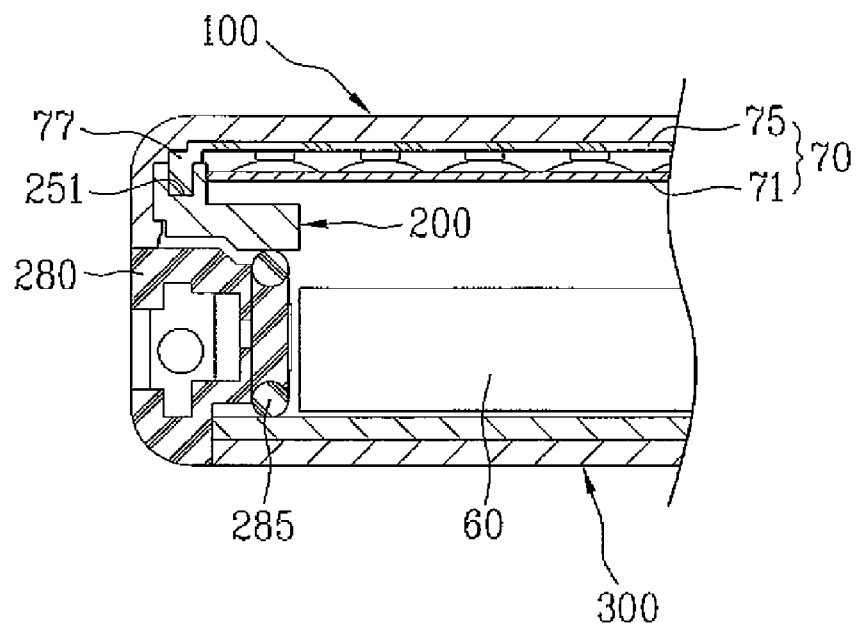
FIG. 6 is a sectional view of a part of the mobile communication device according to the exemplary embodiment of the present invention, illustrating a key skin arranged on a keypad.

The keypad assembly 70 is not limited to the embodiment of FIGS. 3 to 5. For example, as shown in FIG. 6, the keypad assembly 70 may include a key skin 75, in addition to the keypad 71. For reference, FIG. 6 is a sectional view of a part of the mobile communication device according to the first exemplary embodiment of the present invention, illustrating the example in which the keypad assembly further includes a key skin arranged on the keypad.

In the embodiment of FIG. 6, the keypad 71 is arranged in the first chamber 210. The key skin 75 is arranged on the keypad 71, to function as a waterproof member Specifically, the key skin 75 is made of a soft synthetic resin material having a waterproof property. The key skin 75 may be exposed through the opening of the first case 100, to enable the user to press the key skin 75. 100651 The key skin 75 has an edge 77 that surrounds the perimeter of the first chamber 210 when the key skin 75 is arranged on the keypad 71. When the first case 100 and frame 200 are in close contact with each other, the key skin 75 is interposed between the first case 100 and the frame 200. Thus, the first chamber 210 is completely scaled by the edge 77 of the key skin 75. Accordingly, it is possible to effectively prevent water from penetrating into the first chamber 210.

For an enhancement in waterproof performance, a groove 251 may be formed at the top surface of the sidewall of the frame 200 and the top surface of the partition member 250, to receive the edge 77 extending downwardly from the key skin 75. In addition, a protrusion may extend downwardly from the lower surface of the first case 100, to press the edge 77 of the key skin 75 fitted in the groove similar that shown in FIG. 4.

In addition to the keypad assembly functioning as a sealing member, the waterproof member may include a waterproof ring 90, as shown in FIGS. 3 to 5. The waterproof ring 90 is made of a soft rubber material, and is arranged to surround the perimeter of one of the chambers, for example, the second chamber 220. When the first case 100 and frame 200 are in close contact with each other, the waterproof ring 90 is interposed between the frame 200 and the first case. Accordingly, the waterproof ring 90 effectively prevents penetration of water into the second chamber 220 via the boundary between the first case 100 and the frame 200.

For an enhancement in waterproof performance, a groove 253 may be formed at the top surface of the sidewall 201 of the frame 200 and the top surface of the partition member 250 such that the waterproof ring 90 is fitted in the groove 253, as shown in FIGS. 3 to 5. In addition, a protrusion 130 may be formed at the first case 100, to press the waterproof ring 90 fitted in the groove 253 in a state in which the first case 100 and frame 200 are in close contact with each other.

As shown in FIGS. 4 and 5, the waterproof ring 90 may be formed separately from the first case 100 and f lame 200. Of course, the waterproof ring 90 is not limited to such a structure. For example, the waterproof ring 90 may be formed integrally with at least one of the first case 100 and frame 200. As such, the first case 100 or frame 200 formed integral with the waterproof ring 90 may be fabricated using a double injection molding process.

Specifically, the waterproof ring 90 may be formed at a portion of the first case 100 where the protrusion 130 is formed, such that the waterproof ring 90 is integral with the first case 100. Alternatively, the waterproof ring 90 may be formed in the groove 253 such that the waterproof ring 90 is integral with the frame 200. It is also understood that a pair of waterproof rings 90 may be provided which are integral with the first case 100 and frame 200, respectively.

The waterproof member may include both the keypad assembly 70 and the waterproof ring 90. In this configuration, it is preferred that the keypad assembly 70 waterproofs the first chamber 210, and the waterproof ring 90 waterproofs the second chamber 220, as described above.

In addition, as described above, the battery 60 is received in the first chamber 210. Because it is preferable that the battery 60 be replaceable, for the convenience of the user, an opening 240 may be formed through the frame 200, and a battery cover 280 may be provided to open or close the opening 240, as shown in FIGS. 4 and 5. If necessary, the sidewalls of the first and second cases 100 and 300 may be partially cut out, for mounting of the battery cover 280, as shown in FIG. 2.

The opening 240 for the battery 60 is formed at the sidewall 201 of the frame 200 such that it communicates with the first chamber 210 externally of the device. Accordingly, the user can outwardly eject the battery 60 from the first chamber 210 through the opening 240, or can insert the battery 60 into the first chamber 210 through the opening 240.

In order to prevent water from entering the first chamber 210 through the opening 240, a waterproof ring 285 may be arranged between the battery cover 280 and the frame 200. For example, the waterproof ring 285 may be provided at the battery cover 280, as shown in FIGS. 3 to 5. In this case, the waterproof ring 285 is interposed between the battery cover 280 and the frame 200 when the battery cover 280 closes the opening 240, thereby effectively preventing penetration of water into the first chamber 210. Alternatively, although not shown, the waterproof ring 285 may be formed at the opening 240 of the frame 200.

Figure 7:
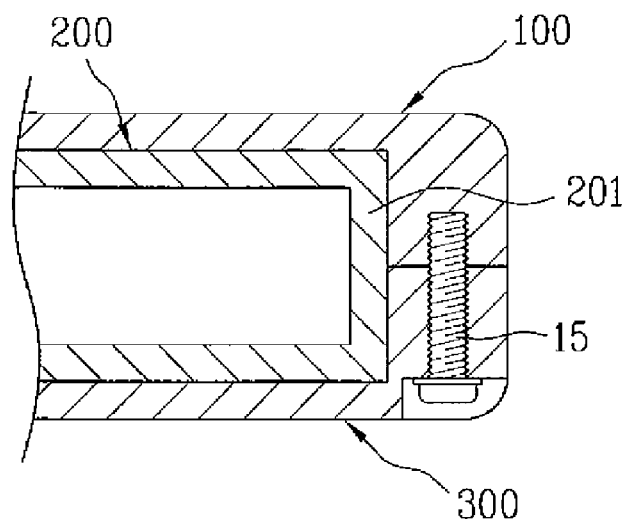
FIG. 7 is a sectional view of a part of the case of the exemplary embodiment of the present invention, illustrating a coupled state of first and second cases and the frame.

Having described the sealing members above, the assembly of the first case 100, second case 300, and the frame 200 will be described. In particular, the second case 300 is arranged beneath the frame 200 while surrounding the frame 200. The second case 300 is coupled with the first case 100 under the condition in which the frame 200 is interposed between the first case 100 and the second case 300. For example, as shown in FIG. 7, the second case 300 is firmly coupled with the frame 200 by fastening members 15. Accordingly, the frame 200 and first case 100 are also in close contact with each other.

The first case 100, second case 300 and frame 200 may be first pre-assembled by a plurality of hooks, after which, the first case 100 and second case 300 are firmly fastened to each other by the fastening members 15. As shown in FIGS. 3 and 4, hooks 140 and grooves 310 are formed at the first case 100 and the second case 300, respectively. Also, grooves or holes 230 and hooks 260, which correspond to the hooks 140 and grooves 310, respectively, are formed at the frame 200. As the grooves or holes 230 and hooks 260 are engaged with the hooks 140 and grooves 310, respectively, the first case 100, second case 300, and frame 200 are pre-assembled.

In the state in which the first case 100, second case 300, and frame 200 are pre-assembled, the sidewall 201 of the frame 200 is arranged inside the sidewalls of the first and second cases 100 and 300. In this state, the fastening members 15 fasten the first and second cases 100 and 300 to each other.

Figure 8:
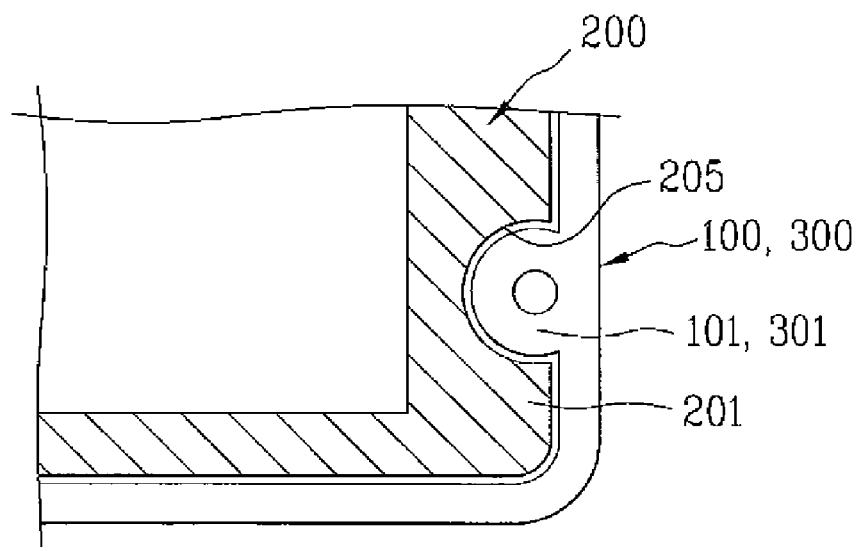
FIG. 8 is a sectional view illustrating relation between the frame and bosses formed on the case.

As shown in FIG. 8, bosses 101 and 301 are formed at the inner surfaces of the sidewalls of the first and second cases 100 and 300, respectively. Thus, the fastening members 15 can be fastened to the bosses 101 and 301. For reference, recesses 205 for receiving the bosses 101 and 301 may be formed at the outer surface of the sidewall 201 of the frame 200.

In the above description, an example is provided in which the case of the mobile communication device according to the present invention includes the first case 100, frame 200, and second case 300. However, the case of the mobile communication device according to the present invention may include only the first case 100 and frame 200, while dispensing with the second case 300. This embodiment is illustrated in FIG. 9 and will be described in more detail hereinafter.

As shown in FIG. 9, a flange 203 extends outwardly from the outer surface of the sidewall 201 of the frame arranged inside the first case 100 while surrounding the chambers of the first case 100. The flange 203 is arranged to face the lower end of the sidewall of the first case 100, and forms a lower portion of the sidewall of the mobile communication device. The fastening members 15 fasten the flange 203 to the first case.

Although not shown, flexible thin films may be attached to openings for the speaker, microphone, and the like, to provide a waterproof effect for the openings, respectively. No further description of these flexible thin films will be given because the main object of the present invention is to prevent penetration of water through the boundaries of the pieces of the case.

When the mobile communication device having the above-described structure according to the present invention is exposed to water, a small amount of water may penetrate into the boundary between the first case 100 and the second case 300 or into the boundary between the first case 100 and the flange 203 of the frame 200.

However, even when a small amount of water penetrates into the interior of the mobile communication device via the boundary, the penetrated water is blocked by the sidewall 201 of the frame 200, so that it cannot immediately affect the elements mounted in each chamber. This is because the water penetrated through the boundary cannot immediately overflow the sidewall 201 because the sidewall 201 of the frame 200 is arranged perpendicular to the boundary.

Even when the amount of penetrated water is increased, the penetrated water reaching the sidewall 201 of the frame 200 cannot pass through the waterproof members interposed between the frame 200 and the first case 100, namely, the edge 73 of the keypad assembly 70 and the waterproof ring 90. As a result, water cannot enter each chamber where elements of the mobile communication device are received. Accordingly, it is possible to effectively prevent damage of the device caused by dipping of the device into water.

In the device according to the present invention, the frame 200 and partition member 250 partitions the interior of the case into a plurality of small chambers, and the keypad assembly 70 and waterproof ring 90 independently seal the chambers. Accordingly, it is possible to obtain a superior waterproof performance using the fastening members fastened at a reduced number of positions by a reduced fastening force, as compared to the case in which a waterproof member is installed along the entire peripheral portion of the case.

Although the present invention has been described in conjunction with a mobile communication device, and a mobile phone in particular, it may also be applied to portable electronic appliances that include a case having a size and shape similar to that of the mobile communication device.

It will be apparent to those skilled in the art that various modifications and variations can be made in the present invention without departing from the spirit or scope of the inventions. Thus, it is intended that the present invention covers the modifications and variations of t his invention provided they come within the scope of the appended claims and their equivalents.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A mobile phone comprising:
a first case;
a frame defining a space for elements of the mobile phone, the frame together with the first case dividing the space into a plurality of chambers;
sealing means interposed between the frame and the first case for independently sealing more than one of the plurality of chambers;
an opening formed in a sidewall of the frame to allow a battery to be inserted into one of the plurality of chambers;
a battery cover to close the opening; and
a waterproof member interposed between the battery cover and the frame when the battery cover closes the opening.

2. The mobile phone according to claim 1, wherein the sealing means is waterproof.

3. The mobile phone according to claim 1, wherein:
the plurality of chambers includes a first chamber having a first perimeter, and
the sealing means includes a keypad located in the first chamber, the keypad having an edge arranged to surround the first perimeter, and the edge being interposed between the first case and the frame.

4. The mobile phone according to claim 1, further comprising a keypad located in one of the plurality of chambers; and
wherein the one of the plurality of chambers has a first perimeter, and the sealing means includes a key skin disposed on the keypad, the key skin having an edge arranged to surround the first perimeter, and the edge being interposed between the first case and the frame.

5. The mobile phone according to claim 1, wherein the sealing means includes a waterproof ring arranged to surround a perimeter of one of the chambers, the waterproof ring being interposed between the first case and the frame.

6. The mobile phone according to claim 5, wherein the waterproof ring is integral with one of the first case and the frame.

7. The mobile phone according to claim 1, wherein the frame includes a partition member configured to divide the space into two of the plurality of chambers, the partition member includes a groove in which the sealing means is located.

8. The mobile phone according to claim 1, wherein the frame further includes:
a sidewall located inside the first case such that the sidewall surrounds the plurality of chambers; and
a flange extending outwardly from the sidewall, the flange being coupled to the first case by fastening members.

9. The mobile phone according to claim 1, further comprising:
a second case located at a surface of the frame opposite the first case, the second case being coupled to the first case to cause the frame and the first case to be in contact with each other.

10. A mobile phone comprising:
a first case;
a frame defining a space for elements of the mobile phone, the frame together with the first case dividing the space into a first chamber and a second chamber;
a first sealing member being interposed between the frame and the first case for sealing the first chamber; and
a second sealing member being interposed between the frame and the first case for sealing the second chamber,
wherein the first sealing member and the second sealing member are adapted to independently seal the first chamber and the second chamber.

11. The mobile phone according to claim 10, wherein:
the first chamber has a first perimeter; and
the first sealing member is a keypad located in the first chamber, the keypad having an edge arranged to surround the first perimeter, and the edge being interposed between the first case and the frame.

12. The mobile phone according to claim 10, further comprising a keypad located in the first chamber; and
wherein the first chamber has a first perimeter, and the first sealing member is a key skin disposed on the keypad, the key skin having an edge arranged to surround the first perimeter, and the edge is interposed between the first case and the frame.

13. The mobile phone according to claim 10, further comprising:
an opening formed through the frame, the opening communicating with the first chamber;
a battery inserted into the first chamber through the opening;
a battery cover for closing the opening; and
a waterproof member interposed between the battery cover and the frame when the battery cover closes the opening.

14. The mobile phone according to claim 10, wherein the frame further includes:
a sidewall arranged inside the first case such that the sidewall surrounds the first and second chambers; and
a flange extending outwardly from the sidewall, the flange being coupled to the first case by fastening members.

15. The mobile phone according to claim 10, further comprising:
a second case arranged to surround the frame, the second case being coupled with the first case to cause the frame and the first case to be in contact with each other.

16. The mobile phone according to claim 10, further comprising a display located in the second chamber.

17. A mobile phone comprising:
a frame, the frame having a partition wall defining a first chamber and a second chamber;
a first case coupled to the frame, the first case forming a top of the first chamber and the second chamber; and
a sealing ring about a perimeter of the second chamber, the sealing ring interposed between the frame and first case.

18. The mobile phone of claim 17, further comprising:
a keypad positioned over the first chamber; and
a display positioned over the second chamber.

19. The mobile phone of claim 17, further comprising:
a groove about the perimeter of the second chamber, the sealing ring disposed in the groove; and
a flange extending downwardly from the first case, the flange overlying the sealing ring.

* * * * *